Figure 1:
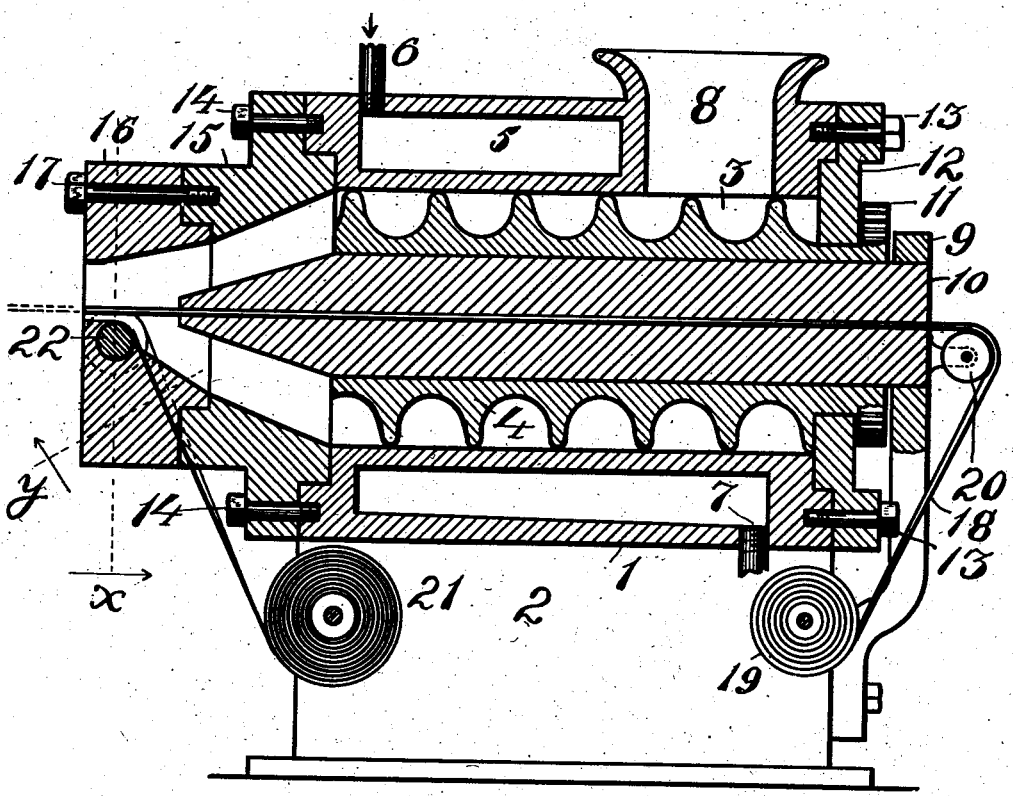

No. 815,571. PATENTED MAR. 20, 1906.
J. K. WILLIAMS.
MACHINE FOR MAKING CONTINUOUSLY FORMED ARTICLES FROM PLASTIC MATERIAL.
APPLICATION FILED AUG. 31, 1905.

2 SHEETS—SHEET 1.

Witnesses:
A. E. King.
Glenara Fox.

Inventor,
John K. Williams
by C. C. Humphrey.
Atty.

No. 815,571. PATENTED MAR. 20, 1906.
J. K. WILLIAMS.
MACHINE FOR MAKING CONTINUOUSLY FORMED ARTICLES FROM PLASTIC MATERIAL.
APPLICATION FILED AUG. 31, 1905.

2 SHEETS—SHEET 2.

Witnesses:
G. E. King
Glenara Fox

Inventor
John K. Williams
by C. E. Humphrey
Atty.

UNITED STATES PATENT OFFICE.

JOHN K. WILLIAMS, OF AKRON, OHIO.

MACHINE FOR MAKING CONTINUOUSLY-FORMED ARTICLES FROM PLASTIC MATERIAL.

No. 815,571.  Specification of Letters Patent.  Patented March 20, 1906.

Application filed August 31, 1905. Serial No. 276,541.

*To all whom it may concern:*

Be it known that I, JOHN K. WILLIAMS, a citizen of the United States, residing at Akron, in the county of Summit and State of Ohio, have invented new and useful Improvements in Machines for Making Continuously-Formed Articles from Plastic Material, of which the following is a specification.

This invention relates to improvements in machines for continuously forming articles from plastic material, and has especial relation to machines for forming elastic vehicle-tires from unvulcanized rubber.

The object of my invention is to provide a machine for forming continuous elastic vehicle-tires from a mass of unvulcanized rubber and to simultaneously incorporate therein various forms of strengthening devices and at the same time to cover one or more of the surfaces of the tire with fabric and to cause it to adhere thereto.

The invention further aims to provide a simple and effectual device which can be readily operated and in which the number of parts used is reduced to a minimum and the operations involved will greatly simplify the preparation of continuously-formed rubber articles for vulcanization.

Heretofore in the manufacture of continuously-formed rubber articles from such plastic substances as "rubber," wherein it is desired to incorporate in them suitable strengthening devices, it has been customary to first shape the articles and afterward insert the strengthening devices, and experience has demonstrated that the forcing of strengthening articles into previously-formed green unvulcanized rubber articles tends to distort the articles and their location therein is relatively uncertain and to a large extent unsatisfactory, and it has further been found that where it is necessary to coat the base portion and part of the sides of the tire with fabric it must be accomplished by hand and at the time the articles are placed in the molds for vulcanizing, and hence my invention aims to obviate these disadvantages and to accomplish these several desirable results mechanically and at one operation during the time that the article is being continuously formed.

With the foregoing and other objects in view the invention consists of the novel construction, combination, and arrangement of parts constituting the invention to be hereinafter referred to, and illustrated in the accompanying drawings, which form a part of this specification, in which is shown the preferred embodiment of the invention; but it is to be understood that changes, variations, and modifications can be resorted to which come within the scope of the claims hereunto appended.

Figure 2:
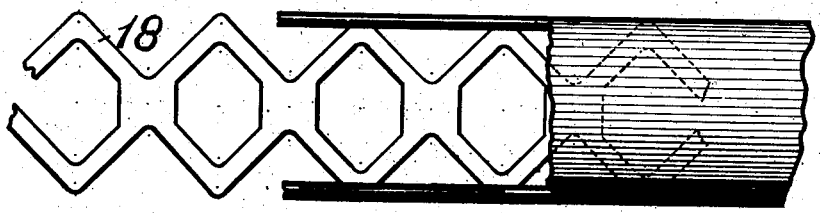
Figure 3:
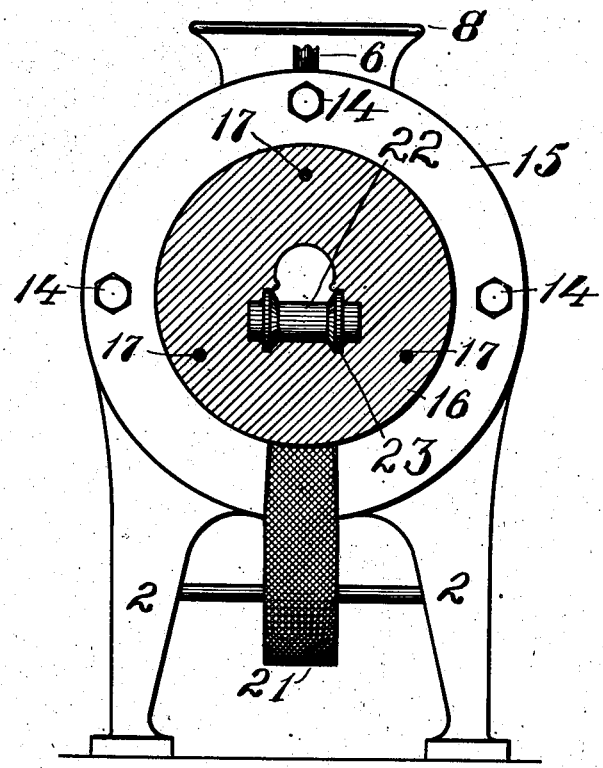
Figure 4:
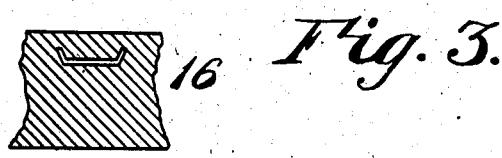
Figure 5:
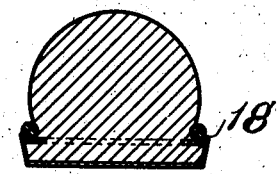

In the drawings, in which similar reference numerals indicate like parts in the different figures, Figure 1 is a central longitudinal section of my improved device. Fig. 2 is a plan view of a tire with portions thereof removed, showing the internal construction thereof. Fig. 3 is a section of Fig. 1 at the line X. Fig. 4 is a section of Fig. 1 at the line Y, and Fig. 5 is a transverse sectional view of a tire formed by the device shown in Fig. 1.

In the drawings, the reference-numeral 1 represents the main outer casing of the device, which is supported upon legs 2. Longitudinally through the casing 1 is a cylindrical opening 3. Within the opening 3 and arranged to fit therein is a feed-screw 4. In the wall of the casing 1 is formed a steam-chamber 5, to which steam is admitted by the inlet-pipe 6 and from which steam and water escape by means of the outlet 7. Through the top portion of the casing 1 is a feed-opening 8, by which the material to be operated on by the screw 4 is fed to the opening 3.

On the rear of the machine, which is the right in Fig. 1, is a bracket 9, which supports an irrevoluble horizontal mandrel 10, which passes through a suitable opening in the screw 4 and is also sustained in position thereby. The rear end of the screw 4 extends beyond the normal outlines of the opening 3 and is preferably provided outside thereof with a tooth portion 11, into which may mesh a driving-gear, (not shown in the drawings,) which may be of any ordinary or preferred construction, by which power is conveyed for revolving the feed-screw around the mandrel 10 as a center.

A head 12 serves to close the rear end of the device and is retained in position by means of bolts 13, which engage the ends of the casing 1. This head 12 is provided with a circular central opening to receive and form a close union with the screw 4, and at the point where the screw passes through the opening in the head 12 it is cylindrical and adapted to make a fairly approximately tight joint therewith. The front end of the mandrel 10 is tapered and projects outwardly from the opening 3.

Arranged to be fastened to the front end of the casing 1 by means of bolts 14 is a die-carrying head 15, having a tapered internal cavity, with the larger end of the opening arranged to register with the opening 3 of the casing 1. Upon the outer front end of the die-carrying head 15 is a die 16, and this die is retained in position by being secured to the die-carrying head 15 by means of bolts 17. This die is provided with an opening in its outer face of such a shape and conformation as that which it is desired to impart to the article to be manufactured by this device. The portions of the die having the opening to which this conformation is given extends rearwardly a short distance, and from there the opening in the die tapers outwardly, so as to join and register with the opening in the die-carrying head 15, so that from the opening 3 a continuous and constantly-narrowing passage extends to the point of outlet in the die, and centrally disposed in this opening is the projecting forward end of the mandrel 10.

In order to better illustrate and describe the operation of this device, it will be presumed that the article to be produced is a tire having the cross-sectional configuration illustrated in Fig. 5, and the description given in reference to the device will be confined to a machine which will produce a tire of this type.

Centrally through the mandrel 10 is a longitudinal opening, through which it is constantly designed to feed a perforated tape 18 from a spool 19, which may be located below the casing 1 and between the legs 2. From this spool the tape 18 is led around a pulley 20 and from there it passes centrally and longitudinally through the mandrel 10 and is grasped and becomes incorporated in the plastic material issuing from the opening in the die 16. The peculiar conformation of the tape 18 may be varied to suit the requirements of the case; but the form shown in Fig. 2 will serve to illustrate the operation of this device.

In manufacturing tires of the type shown in Fig. 5 it will be stated that it is customary to cover not only the base portion of the tire, but a portion of the sides thereof, with canvas, duck, or other fabric, so as to prevent wear thereon and prolong the life of the tire. In order to feed the fabric properly to the tire as it issues from the mouth of the die, I place below the casing 1, and preferably between the legs 2, a reel 21, of fabric of a suitable kind and width, and from thence the fabric is led through an opening in both the die-carrying head and die to a roller 22, which is mounted in the die adjacent the base portion of the opening therein, and from thence the fabric passes outward and is caused to adhere to the base portion of the tire as it issues from the die. It will be noted that the roller 22 is provided with two flanges 23, having inclined inner faces, which serve to shape a portion of the sides of the tire as they issue from the die, and they also serve to fold upwardly the side edges of the fabric as it passes from the reel 21, so as to cause the adherence of the outer edges of the fabric to a portion of the sides of the issuing tire. The opening through the die-carrying head 15 and die 16 is shaped as shown in Fig. 4, and thus the fabric as it passes through this opening is properly shaped to pass around over the face of the roller 22, and having upwardly-bent edges attaches itself both to the side edges of the tire and to the base thereof.

The operation of this device is as follows: It will be presumed that steam is constantly admitted to the chamber 5 to keep the entire device heated to such a degree as to prevent the cooling or stiffening of the material during its manipulation in this device, and any water which may be caused by condensed steam will escape from the chamber 5 by means of the eduction-pipe 7. A sufficient supply of tape 18 having been pulled through the mandrel 10 so as to project from the front end thereof and the end of a strip of fabric from the reel 21 having been passed through the opening in the head 15 and die 16 so as to pass over the roller 22, the plastic material is then fed through the opening 8 and the feed-screw 4, which is constantly revolved in a direction to force the material fed to it out through the opening in the die 16. As this material issues from the opening in the die 16 it will have an external conformation equivalent to the internal conformation of the opening in the die 16, with the medial portion of the roller 22 serving as a means for shaping the base portion of the article and the inner inclined faces of the flanges 23 to shape the lower sides of the article. As the material exudes from the die it grasps and surrounds the tape 18, carrying it forward with itself, and at the same time it adheres and becomes attached to the fabric fed from the reel 21, which also unwinds as it is fed forward with the issuing article, so that as long as material is supplied to the device and tape and fabric are supplied to the reels 10 and 21, respectively, a tire such as is shown in Figs. 2 and 5 will be produced continuously. After being thus formed the article, if made of rubber, will be taken to a vulcanizer and properly cured.

What I claim, and desire to secure by Letters Patent, is—

1. A machine of the class described comprising an inclosing casing provided with an opening therein, a revoluble feeding-screw in said opening, a perforated mandrel arranged to pass through said opening in said screw, means whereby plastic material may be fed to said screw, a die suitably sustained in position with respect to said screw and mandrel, means to conduct a stiffening device or its equivalent through said mandrel whereby it will be incorporated in the material issuing from said die, and means to cover a portion of the material issuing from said die with fabric or its equivalent.

2. The combination in a machine of the class described provided with a revoluble feeding-screw therein, of means to permit the feeding of material to said screw, a die-carrying head in said casing, a die provided with a suitably-conformed opening attached to said die-carrying head, a perforated mandrel in said casing arranged to pass through said screw, means to convey a continuously-formed stiffening device through said mandrel to the opening in said die, and means to convey to said opening a continuously-formed strip of fabric or its equivalent.

3. In a machine of the class designated, the combination with a hollow casing having a feed-opening at one end, of a feed-screw in said casing, a forming-die situated adjacent the discharge end of said screw, a friction-reducing member mounted in said die to form a portion of the normal outlines of the die-opening, and means to feed a continuously-formed stiffening device through said die whereby the same will become incorporated with the material fed through said die by said feed-screw.

4. A machine of the class designated, comprising a hollow casing provided with a feed-opening, a feed-screw mounted for rotation in said casing, a forming-die suitably mounted to receive and shape the material fed thereto by said screw, means to feed stiffening means through said die, whereby the same will become incorporated with the material issuing from said die, and means to cover a portion of said material with fabric.

In testimony whereof I have hereunto set my hand in presence of two subscribing witnesses.

JOHN K. WILLIAMS.

Witnesses:
 C. E. HUMPHREY,
 GLENARA FOX.